(No Model.)
T. B. ATTERBURY.
MANUFACTURE OF GLASSWARE.
No. 499,085. Patented June 6, 1893.
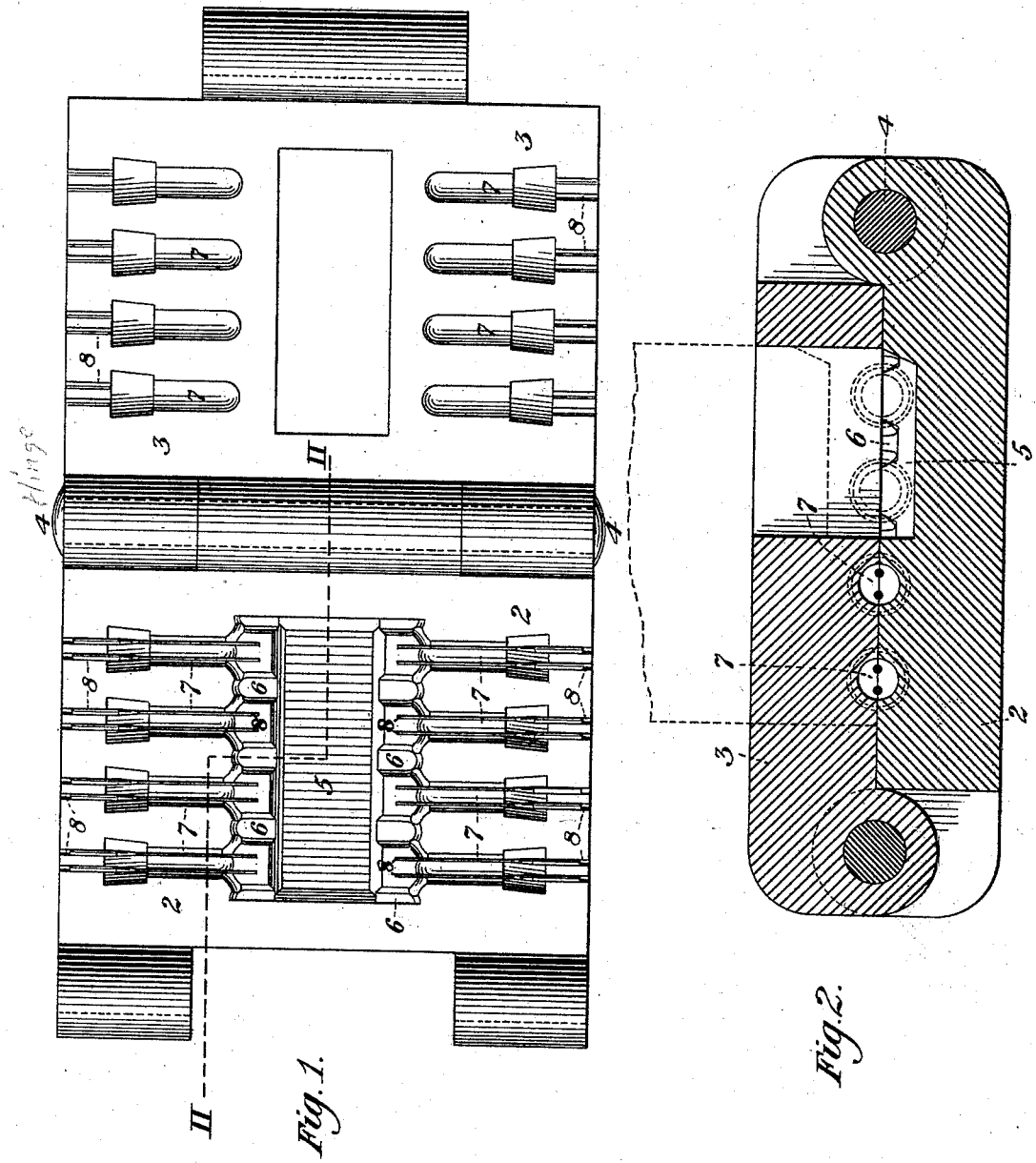
WITNESSES
INVENTOR

UNITED STATES PATENT OFFICE.

THOMAS B. ATTERBURY, OF PITTSBURG, PENNSYLVANIA.

MANUFACTURE OF GLASSWARE.

SPECIFICATION forming part of Letters Patent No. 499,085, dated June 6, 1893.

Application filed September 24, 1892. Serial No. 446,781. (No model.)

*To all whom it may concern:*

Be it known that I, THOMAS B. ATTERBURY, of Pittsburg, in the county of Allegheny and State of Pennsylvania, have invented a new and useful Improvement in the Manufacture of Glassware and in Apparatus Therefor, of which the following is a full, clear, and exact description.

Difficulty has been experienced in the manufacture of appliances for electric incandescent lamps in making plugs or stoppers in which the rear ends of the wires are covered with glass, because of the formation of air bubbles of minute size, which prevent perfect contact with the glass and wire, effect the cracking of the glass, and render the device apt to leak air when applied to the vacuous lamp-bulb.

I have discovered a method and invented means for the prevention of this, and illustrate the same in the accompanying drawings, in which—

Figure 1 shows in plan view an opened two-part glass mold of my invention adapted to the practice of said method. Fig. 2 is section taken as if on the line II—II, showing the mold closed.

My invention consists in a method of making glass articles with embedded wire or rods by causing the molten glass to flow along the wire progressively from one end to the other, thus displacing the air and preventing the imprisonment of bubbles.

It also consists in an improved apparatus comprising a mold having a matrix cavity or cavities with means for holding the wires or rods, an end-passage or passages for the admission of the molten glass, and a vent or vents for the escape of air.

In the drawings, 2, 3, represent the parts of a mold which may be hinged together at 4. The glass plugs or stoppers containing the wires are pressed in matrices leading from a central fount-cavity, since in this way a number of the plugs can be pressed at one operation and the manufacture thus expedited.

5 is the central fount-cavity, having diverging therefrom channels 6 leading into substantially horizontal mold-cavities 7, which are of the shape intended to be imparted to the glass plugs or stoppers. At opposite ends of each cavity 7 are recesses 8, adapted to hold the parallel metallic wires medially in the cavity with their ends projecting in the recesses, which are somewhat larger than the wires and communicate with the open air so as to form vents for escape of air from the mold. The arrangement and manner of forming the air-vents may be modified. The channels 6 communicate with the cavities 7 at one end thereof, as shown. The mold-cavities 7 are formed partly in one section and partly in the other section of the mold, and when the parts of the mold are closed together, the cavities are completed in form, as shown in Fig. 2.

In use of the mold, a gathering of molten glass is inserted into the fount-cavity of the closed mold-part, and then the usual plunger is caused to descend into the fount-cavity, thereby displacing the glass out through the passages 6 into the ends of the mold-cavities 7, and causing it to flow outwardly through said cavities and along the line of the wires contained therein. In thus passing along the wires from one end to the other, the molten glass displaces the air before it through the end-vents until the glass reaches the extreme ends of the cavity. By this mode of procedure, the glass is caused to adhere perfectly to the wire without intervening air-bubbles, which have been the cause of the trouble heretofore experienced. It is very desirable that the matrix cavities should be horizontal, or substantially so, *i. e.* not nearly vertical, since the horizontal course of the glass enables the easier displacement of the gas-bubbles. When the articles have been thus pressed, the mold is opened, and the united glass stoppers with the embedded wires are removed and broken apart, as is usual in the manufacture of glass articles in fount-molds.

Modifications in the apparatus above described may be made by those skilled in the art, and changes in the form and arrangement, such as necessary to adapt the invention to the manufacture of other articles, may also be made without variance from my invention as defined in the following claims.

The broader claims of the application are not limited to pressing simultaneously a number of the glass articles, although this for many reasons is desirable.

I claim—

1. The method herein described of making glass articles with embedded metal wires or rods, which consists in displacing the molten glass and causing it to flow from end to end of the wire or rod to be embedded, displacing the air before it through a vent; substantially as described.

2. A glass mold, having a mold-cavity or matrix, means for holding therein an article to be embedded, and a vent leading from said article; substantially as described.

3. A glass mold, having a substantially horizontal mold-cavity or matrix, end sockets or recesses for holding metal wire, an end vent at the position of such wire, and a passage for the admission of molten glass; substantially as described.

4. A glass mold having a mold-cavity or matrix, end sockets or recesses for holding metal wire, an end-vent, a passage or gate at the end of the cavity for the admission of molten glass, and a fount-cavity with which said passage communicates; substantially as and for the purposes described.

5. A glass mold, having a fount cavity, a series of mold cavities communicating therewith through gates or passages, means for holding wires in said cavities, and vents leading from the ends of the positions of the wires in the cavities; substantially as described.

In testimony whereof I have hereunto set my hand this 22d day of September, A.D. 1892.

THOMAS B. ATTERBURY.

Witnesses:
THOMAS W. BAKEWELL,
R. H. WHITTLESEY.